United States Patent [19]

Masuda et al.

[11] Patent Number: 4,865,932
[45] Date of Patent: Sep. 12, 1989

[54] ELECTRIC CELLS AND PROCESS FOR MAKING THE SAME

[75] Inventors: Yoshitomo Masuda, Tachikawa; Isamu Shinoda, Sendai; Masao Ogawa, Kawagoe; Toyoo Harada, Sendai; Takao Ogino, Tokorozawa; Kazuo Takayama, Sendai; Tadaaki Miyazaki, Higashiyamoto; Takahiro Kawagoe, Tokorozawa, all of Japan

[73] Assignees: Bridgestone Corporation, Tokyo; Seiko Electronic Components Ltd., Sendai, both of Japan

[21] Appl. No.: 192,932

[22] Filed: May 12, 1988

[30] Foreign Application Priority Data

| May 12, 1987 | [JP] | Japan | 62-115156 |
| Jul. 6, 1987 | [JP] | Japan | 62-168075 |
| Jul. 24, 1987 | [JP] | Japan | 62-185150 |
| Sep. 22, 1987 | [JP] | Japan | 62-238167 |
| Oct. 9, 1987 | [JP] | Japan | 62-255450 |
| Oct. 27, 1987 | [JP] | Japan | 62-269438 |

[51] Int. Cl.$^4$ .................................... H01M 4/40
[52] U.S. Cl. ................................ 429/194; 29/623.1; 429/213
[58] Field of Search ............... 429/218, 194, 197, 213; 29/623.1

[56] References Cited

U.S. PATENT DOCUMENTS

| 4,056,885 | 11/1977 | Rao | 429/218 |
| 4,336,315 | 6/1982 | Eda et al. | 429/194 |
| 4,615,959 | 10/1986 | Hayashi et al. | 429/194 |

Primary Examiner—Donald L. Walton
Attorney, Agent, or Firm—Oblon, Spivak, McClelland, Maier & Neustadt

[57] ABSTRACT

An electric cell comprising a positive electrode, a negative electrode, and an electrolyte containing a lithium salt is provided wherein the negative electrode has a two-layer structure of a lithium-aluminum alloy layer and an aluminum layer. The cell is fabricated by placing a positive electrode, a negative electrode, and an electrolyte in a cell container comprising positive and negative electrode casings, and forming a seal between the positive and negative electrode casings. The negative electrode is electrochemically formed in situ in the cell container from a lithium-clad aluminum substrate.

21 Claims, 1 Drawing Sheet

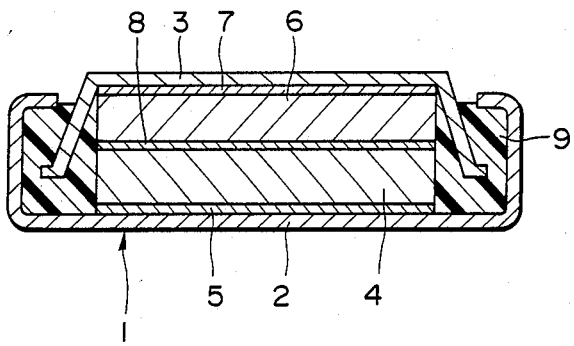

ELECTRIC CELLS AND PROCESS FOR MAKING THE SAME

BACKGROUND OF THE INVENTION

This invention relates to electric lithium cells, preferably used as lithium secondary cells having an extended cycle life.

Lithium secondary cells have drawn a great attention as rechargeable high energy density cells. Lithium secondary cells have the problem that when metallic lithium is used as the negative electrode active material, dendrites grow on the negative electrode as a result of charging and discharging operations. It was recently proposed to use a lithium alloy, particularly a lithium-aluminum alloy as the negative electrode.

The lithium-aluminum alloys known in the art are generally classified into the following two groups.

(1) A metallurgical lithium-aluminum alloy which is obtained by melting a mixture of lithium and aluminum in a proper ratio in an inert atmosphere.

(2) An electrochemical lithium-aluminum alloy which is obtained by electrodepositing lithium on aluminum in an organic solvent containing a lithium salt.

The metallurgical lithium-aluminum alloy (1) is preferably obtained in the form of a sheet when it is used as a cell electrode. However, metallurgical lithium-aluminum alloys currently available in the form of a sheet are alloys of a composition having an extremely low or high content of lithium. Since these lithium-aluminum alloys have a composition approximate to aluminum or lithium alone, they do not exhibit the properties characteristic of lithium-aluminum alloys. It is thus difficult to use these alloys in practice as the cell electrode.

The electrochemical lithium-aluminum alloys (2) are available as alloys having a ratio of lithium to aluminum of approximately 1:1. They are obtained generally in the form of a sheet and initially perform well as the cell electrode. However, we have found that electrochemical lithium-aluminum alloys have several problems when they are actually used as the cell electrode, namely, negative electrode. As charging and discharging operations are repeated, the alloy electrode undergoes cracking or failure to deteriorate electrical contact. Some cells can be charged or discharged no longer. Other cells can be charged, but cannot be discharged for unknown reason. The electrochemical lithium-aluminum alloys have not been acceptable in practice.

Although the prior art lithium-aluminum alloys are superior to lithium alone, they still suffer from serious problems when actually applied as a secondary cell electrode, particularly with respect to cycle properties.

SUMMARY OF THE INVENTION

An object of the present invention is to provide a novel and improved electric cell comprising a negative electrode having a lithium-aluminum alloy layer which is satisfactory for actual application.

Another object of the present invention is to provide an electric cell having an extended cycle life.

We have found that a negative electrode of a two layer structure consisting of a lithium-aluminum alloy layer and an aluminum layer is effective for a lithium cell.

According to the present invention, the negative electrode for a lithium cell has a two-layer structure consisting of a lithium-aluminum alloy layer and an aluminum layer rather than a single layer of lithium or lithium-aluminum alloy as used in the prior art. The aluminum layer of the two-layer structure serves as a mechanical support for the lithium-aluminum alloy layer which itself is brittle and fragile. The lithium-aluminum alloy layer not only prevents dendrite formation and passivation, but is also effective to secure a minimum discharge amount corresponding to a charge amount by holding in aluminum an amount of lithium which is short when the cell is discharged up to a discharge amount corresponding to a charge amount because the efficiency of movement of lithium into and out of aluminum is not 100%. When a two-layer structure consisting of a lithium-aluminum alloy layer and an aluminum layer is used as a negative electrode, there is obtained a secondary cell having improved performance.

When the ratio in thickness of the lithium-aluminum alloy layer to the aluminum layer ranges from 0.5:1 to 3.5:1, the two-layer structure becomes more effective as the secondary cell negative electrode, particularly with respect to cycle life.

BRIEF DESCRIPTION OF THE DRAWINGS

These and other objects, features, and advantages of the present invention will be better understood by reading the following description taken in conjunction with the accompanying drawing, in which:

The only FIGURE is a schematic cross section of a secondary cell according to one embodiment of the present invention.

DETAILED DESCRIPTION OF THE INVENTION

The lithium cell of the present invention has a negative electrode of a two-layer structure consisting of a lithium-aluminum alloy layer and an aluminum layer.

The aluminum layer is provided to impart a certain mechanical strength to the electrode itself. The aluminum layer plays the role as a mechanical support for the lithium-aluminum alloy layer which itself is brittle and fragile. From the point of view of mechanical support, it is desirable to set the aluminum layer as thick as possible. As charge/discharge operation is repeated, lithium tends to further penetrate into the aluminum layer to form an incremental layer of brittle lithium-aluminum alloy. Since the thickness of the lithium-aluminum alloy layer is increased during service, it is desirable that the initial aluminum layer be as thick as possible. However, the aluminum layer is desirably set to the minimum necessary thickness for the practical reason that it must be received in a limited space of a cell container.

The lithium-aluminum alloy layer prevents dendrite formation and passivation. The alloy layer is also effective to secure a minimum discharge amount corresponding to a charge amount by previously holding in aluminum an amount of lithium which is short when it is desired to discharge the cell up to a discharge amount corresponding to a charge amount because the efficiency of movement of lithium into and out of aluminum is not 100%. The thickness of the lithium-aluminum alloy layer may be determined according to a design guideline.

For better electrode performance, particularly a longer cell cycle life, the two layers are preferably controlled to such thicknesses that the ratio in thickness of the lithium-aluminum alloy layer to the aluminum layer ranges from about 0.5:1 to about 3.5:1, more preferably from about 1:1 to about 3:1, most preferably from about 1.5:1 to about 2.5:1. The reason why it is advantageous to control the ratio of thickness of the two layers within this range is not well understood, but presumed as follows. The amount of the lithium-aluminum alloy layer is determined by a design requirement of cycle life. In order that the electrode material itself does not disintegrate after the lapse of the cycle life, the amount of the initial aluminum layer is determined such that a sufficient aluminum layer to maintain the integrity of the electrode material is left at the end of the cycle life. Within the above-defined range, a good compromise is obtained between the requisite thickness of the two layers. Cell performance is little affected by the presence of a slight amount of metallic lithium which remains on the lithium-aluminum alloy layer at the end of the cycle life. Outside the above-defined range, a good compromise is sometimes lost between the requisite thicknesses of the two layers. When the thickness ratio of the two layers exceeds the above-defined range, there is the likelihood that the electrode material tends to disintegrate with the progress of charging/discharging cycle to deteriorate the electrical contact of the electrode material, rendering it impossible to charge or discharge the cell. When the thickness ratio of the two layers is below the above-defined range, there is the likelihood that although the aluminum layer playing the role of a mechanical support remains, the lithium previously accumulated in the aluminum is depleted to eventually interfere with charging/discharging operation. In addition, the excess aluminum layer occupies the interior space of the cell in vain, which will leave a problem against the requirement of compactness and thickness on the cell. Some cells fail to achieve the desired cycle life when the thickness ratio of the two layers is outside the above-defined range.

The aluminum which forms the aluminum layer preferably has a purity of at least 99.0%. The lithium-aluminum alloy layer preferably has a composition consisting essentially of 40 to 60 atom % of lithium and 60 to 40 atom % of aluminum. Lithium-aluminum alloys having a composition within this range show better performance as the negative electrode in the practice of the present invention.

The negative electrode used in the practice of the present invention may be formed by any desired methods. It is preferred to form the negative electrode by electrochemically introduce lithium into an aluminum plate or sheet of a predetermined thickness from one surface thereof to electrochemically form a lithium-aluminum alloy layer on one surface of the aluminum plate or sheet. The other surface of the aluminum plate or sheet through which no lithium is introduced or diffused is left as an aluminum layer. More particularly, the negative electrode of a two-layer structure is prepared by constructing a special type of electrolytic cell from lithium and aluminum, and supplying controlled electricity from an external electric source to the cell to electrodeposit lithium on one surface of aluminum to thereby form a lithium-aluminum alloy layer on the one surface.

More preferred method for forming the negative electrode of a two-layer structure is by contact bonding lithium to an aluminum substrate, placing the lithium-clad aluminum substrate as a cell component in a cell container, filling the container with an electrolyte, and effecting electrochemical alloying of lithium with aluminum in the container with the aid of the electrolyte. Then a lithium-aluminum alloy layer is electrochemically formed on the side of the aluminum substrate to which lithium is bonded while the other side of the aluminum substrate remote from the lithium cladding is left as an aluminum layer. This method has the advantages of simplifying preparation of a two-layered electrode and reducing the cost thereof.

In the practice of the above method, the aluminum substrate to which lithium is bonded under pressure preferably has a surface whose surface roughness has a root mean square deviation of from about 1.5 to about 5 μm.

More particularly, when it is desired to form as sound lithium-aluminum alloy free of residual metallic lithium by dipping an aluminum substrate having lithium clad thereto in an organic electrolyte followed by an electrochemical treatment, a path for electron conduction must be maintained between the aluminum substrate and the lithium cladding until the alloying is completed. That is, an appropriate contact must be always kept between the aluminum substrate and the lithium cladding. When the aluminum substrate having lithium clad thereto is dipped in an electrolyte, however, the electrolyte penetrates between the aluminum substrate and the lithium cladding to promote their separation.

If the aluminum substrate is provided with an irregular surface by appropriate machining such as abrasion, then lithium is embedded in the irregularities of the aluminum substrate by bonding lithium to the aluminum substrate. Then the resistance of the lithium-clad aluminum substrate against separation by the penetrating electrolyte is increased and the surface area over which lithium is in contact with aluminum is increased. At the same time, surface roughening of the aluminum substrate removes oxides from the aluminum substrate surface, accelerating diffusion of lithium ions into aluminum.

We have made a further investigation to determine the optimum surface roughness of an aluminum substrate. We have found that an optimum contact is accomplished between an aluminum substrate and lithium by roughening the surface of the aluminum substrate such that the root mean square deviation of surface roughness falls in the range of from about 1.5 μm to about 5 μm. Outside this range, some problems would occur. With a root mean square deviation of less than 1.5 μm, such a slightly roughened aluminum substrate will provide no advantageous effect as compared with a flat surface which has not been roughened. With a root mean square deviation of more than 5 μm, the roughened surface has so large irregularities that they would act like notches or obstacles, causing cracks or voids in a brittle lithium-aluminum alloy layer being formed. The most preferred range of the root mean square deviation of surface roughness is from about 3 μm to about 4 μm.

It is to be understood that the root mean square deviation ($h_{rms}$) of surface roughness is measured by using a commercially available surface profilometer, and is represented by the equation:

$$h_{rms} = 1/n \cdot (\Sigma h_i^2)^{\frac{1}{2}}$$

wherein n is the number of points of measurement, or $$h_{rms} = (1/l \int_o^l h^2 dx)^{\frac{1}{2}}$$

wherein l is the length of the surface over which measurement is made provided that n is infinite.

The aluminum substrate may be roughened to a surface roughness within the above-defined range by any suitable roughening methods including abrasion with empty paper and sand blasting.

In the practice of the present invention, a cell may be fabricated by bonding lithium to an aluminum substrate under pressure, placing the lithium-clad aluminum substrate in a cell container, causing alloying to take place within the container, thereby forming a negative electrode of a two-layer structure consisting of a lithium-aluminum alloy layer and an aluminum layer. More precisely, a cell is assembled by sealing positive and negative electrodes, electrolyte and other cell components in a cell container. It is preferred to apply pressure to the container at the end of cell assembling. The pressure applied to the container always holds the lithium in close contact with the aluminum substrate throughout the alloying reaction to maintain an electron conduction path necessary for the alloying reaction, markedly reducing the alloying reaction time.

The magnitude of pressure and the method of pressure application may be determined depending on the type of the cell or the like. The pressure applied is preferably at least 10 kg/cm$^2$, more preferably at least 50 kg/cm$^2$, most preferably at least 100kg/cm$^2$ although it is not critical. Pressure may be applied by any desired methods including pressure applications by hydrostatic means, press, and screw type holder. The parameters and modes of pressure application may be selected by taking into account the shape and strength of the cell container such that the cell container may not be damaged. The direction of pressure application is preferably perpendicular to the interface between contacting lithium and aluminum, for example, in a thickness direction when the aluminum substrate is in the form of a film or sheet. It is crucial that pressure application is continued until alloying of lithium with aluminum is completed.

Pressure may applied at room temperature or at elevated temperatures. Preferably pressure is applied under heating conditions to increase the lithium alloying rate. Higher the heating temperature, the higher is the lithium alloying rate. At heating temperatures in excess of 100° C., however, some problems would occur. In the case of organic solvents having a low boiling point, a special equipment must be installed to prevent evaporation of the solvent, and alloying and pressure applying operations are somewhat hindered. Since lithium will react with the organic solvent at such elevated temperatures to form decomposed products of the solvent, the resulting lithium alloy is contaminated therewith. For these reasons, the heating temperature preferably ranges from about 20° to 100° C., more preferably from about 20° to 80° C., and most preferably from about 30° to about 60° C.

Preferably, a cell is fabricated by placing cell components including a positive electrode material, lithium-clad aluminum substrate, and electrolyte in a cell container comprising positive and negative electrode casings in a closely packed manner, forming a seal between the positive and negative electrode casings, causing the lithium and aluminum to electrochemically alloy with each other, thereby forming an electrode of a two-layer structure, and at the same time as alloying, repeating sealing operation as the volume of the components in the container changes, thereby maintaining the interior of the container sealed. With this process, an electrode of a two-layer structure consisting of a lithium-aluminum alloy layer and an aluminum layer can be readily formed in situ within a short time. There is obtained a cell which exhibits improved performance including an extended charge/discharge cycle life and improved self-discharging properties.

Referring to the FIGURE, there is illustrated one embodiment of the cell of the present invention. The cell includes a cell container 1 consisting of a positive electrode casing 2 and a negative electrode casing 3. A positive electrode 4, a current collector 5 for the positive electrode, a negative electrode 6, and a current collector 7 for the negative electrode are received in the container 1. A separator 8 intervenes between the positive and negative electrodes 4 and 6. A gasket or insulating packing 9 forms a gas-tight seal between the positive and negative electrode casings 2 and 3.

The cell is assembled by placing the cell components including positive electrode 4, positive electrode current collector 5, negative electrode 6, negative electrode current collector 7, and separator 8 in the container, and forming a seal between the positive and negative electrode casings 2 and 3. The cell components are sealingly packed in the container at the end of assembling. Sealing operation is carried out once in a conventional cell fabricating process. According to the preferred embodiment of the present invention, sealing operation is repeated as the volume of the cell components charges with time after assembling, thereby maintaining a sealing package of the components.

More particularly, according to the preferred embodiment of the present invention, a negative electrode is formed in situ, that is, electrochemical reaction or alloying is carried out within the cell container. The in situ alloying has disadvantages in that it takes a certain time for lithium to alloy with aluminum and that some lithium often remains unalloyed even after a long period of alloying reaction. If a lithium alloy in which alloying has not completed is used in a cell, then residual lithium would decompose the electrolyte or form dendrites during the charging/discharging process. Also residual lithium would float on the electrolyte causing self-discharging.

When a cell is fabricated by contact bonding lithium to aluminum, placing the lithium-clad aluminum as a negative electrode material in a cell container together with the remaining components, and carrying out alloying within the container to thereby form an electrode of a two-layer structure consisting of a lithium-aluminum alloy layer and an aluminum layer, it is advantageous to carry out sealing operation on the container at least two times, first just after placing the components in the container and then during the alloying step. Since the volume of the lithium-clad aluminum decreases with a progress of lithium alloying, the second and subsequent sealing operations are carried out to reduce the interior volume of the container to maintain the lithium cladding in close contact with the aluminum. The second and subsequent sealing operations lead to the advantages that the time required for alloying reaction of lithium-clad aluminum is drastically reduced and that the resulting two-layer structure consisting of a lithium-aluminum alloy layer and an aluminum layer has no or little residual lithium. It is therefore very advantageous in the cell fabricating process of the present invention to carry out sealing operation at least two times at a suitable interval.

In the preferred embodiment of the cell fabricating process of the present invention, sealing operation is carried out on the container at least two times at a suitable interval after the lithium-clad aluminum and the remaining requisite components including the positive electrode, separator, and electrolyte are placed in the container. The second and subsequent sealing operations are operations to bring the positive and negative electrode casings in tight sealing contact with the gasket to prevent leakage of the contents. The sealing operation is carried out to reduce the interior volume of the container to hold the components in the container in tight contact, closely packed conditions. Preferably, the second or subsequent sealing operation reduces the interior volume of the container by 1 to 40%, more preferably by 3 to 20% of the interior volume of the container before the sealing operation. The reason why a reduction of the interior volume of the container is effective in forming a lithium-aluminum alloy is not clearly understood. It seems that information of a lithium-aluminum alloy is largely affected by a change of volume during alloying process. The process of alloying of lithium and aluminum will be described in more detail. Lithium, aluminum, and lithium-aluminum alloy have a density of 0.534 g/cm$^3$, 2.7 g/cm$^3$ and 1.73 g/cm$^3$, respectively. Then the volume of lithium-clad aluminum substrate decreases with a progress of alloying. With a decrease of volume, the lithium cladding tends to separate away from the aluminum substrate. If the lithium cladding is spaced apart from the substrate, an electron conduction path necessary for alloying reaction is lost so that the alloying reaction is interrupted. By sealingly compacting the container to reduce the interior volume thereof, an electron conduction path is maintained despite a change of volume of negative electrode material so that alloying may smoothly proceed to completion.

The sealing operation or compaction may be carried out any desired times as long as the operation reduces the interior volume of the container. In consideration of manufacture cost, it is desirable to achieve the compacting effect by carrying out the sealing operation only two or three times. More preferably, the second or third sealing operation is carried out about 12 hours to 4 days after the first sealing operation.

It should be understood that although the negative electrode collector is provided in the embodiment shown in the figure, the lithium-clad aluminum substrate may be directly connected to the negative electrode casing without a collector. In this case, it is preferred to first attach an aluminum substrate to a casing by resistance welding, supersonic welding, soldering, or adhesive bonding, and then contact bond lithium to the aluminum substrate.

The aluminum substrate is preferably secured to the negative electrode casing at five or more points. More particularly, the aluminum substrate to be alloyed with lithium is welded to the negative electrode casing at five or more spots. The negative electrode casing having the aluminum substrate joined thereto is then assembled with the positive electrode casing together with the remaining cell components. Alloying is then carried out within the container. With this process, the time required for alloying reaction of lithium-clad aluminum substrate can be greatly reduced and the resulting lithium-aluminum alloy has a minimal amount of residual lithium. The negative electrode resulting from alloying of lithium to the aluminum substrate is secured to the negative electrode casing at the same five or more points. The resulting cell exhibits improved performance including internal resistance, self-discharging, and cycle life.

The reason why a secondary cell comprising a lithium-aluminum alloy electrode having a minimal amount of residual lithium is obtained readily and briefly by securing the aluminum substrate to the negative electrode casing at five or more points as described above is not clearly understood. If a lithium-clad aluminum substrate is assembled in a cell without bonding the aluminum substrate to the negative electrode casing or with the aluminum substrate bonded to the negative electrode casing only at less than five points, the aluminum substrate would warp with a progress of alloying reaction due to the difference in density among aluminum, lithium and lithium-aluminum alloy. Then the lithium fails to follow the warping aluminum substrate and separates from the substrate. An electron conduction path necessary for alloying reaction is then lost and the alloying reaction is interrupted. There would occur the same problems as previously describe. When the aluminum substrate is secured to the negative electrode casing at five or more points, the aluminum substrate does little warp so that no separation occurs between the lithium cladding and the aluminum substrate. A close contact is maintained between the lithium cladding and the aluminum substrate throughout the alloying reaction to insure an electron conduction path necessary for alloying reaction. Alloying is thus completed within a short time.

The number of points at which the aluminum substrate is secured to the casing is at least 5, preferably at least 10, and more preferably at least 15. The entire surface of the aluminum substrate may be secured to the casing if necessary. When aluminum is secured to the negative electrode casing, a lithium-clad aluminum substrate on its aluminum side may be secured to the casing. However, a cell is preferably fabricated by first securing an aluminum substrate having no lithium clad to the negative electrode casing, contact bonding lithium to the aluminum substrate, and then assembling the negative electrode casing having the lithium-clad aluminum substrate secured thereto (which subsequently forms the negative electrode) with the positive electrode casing along with the remaining cell components. It is preferred to secure the aluminum substrate to the negative electrode casing at uniformly distributed points.

The method for securing the aluminum substrate to the negative electrode casing is not particularly limited as long as the requirement of securing point number is met. For example, welding, soldering and adhesive bonding may be used. Among them, welding, particularly ultrasonic welding is preferred. Ultrasonic welding has many advantages in productivity and cost because the aluminum substrate can be welded to the negative electrode casing at a plurality of spots in one step. Another advantage is that the number of welding spots may be changed by adjusting the shape of the horn and stationary anvil used in ultrasonic welding. A special design of the stationary anvil makes it possible to indent the negative electrode casing, accomplishing welding and indenting operations at the same time. Ultrasonic welding not only ensures that the aluminum substrate is welded to the negative electrode casing, but at the same time, roughens the surface of the aluminum substrate opposite to the casing due to vibration and clamping pressure of the welding horn, eliminating the need for roughening (e.g., sanding) of the aluminum substrate surface in order to prepare for complete alloying at the interface between lithium and aluminum. Thus ultrasonic welding eventually contributes to in situ alloying of lithium with aluminum, making it possible to form a lithium-aluminum alloy having a minimal amount of residual lithium within a short period of time.

The conditions under which ultrasonic welding is carried out may be appropriately selected and not particularly limited. However, ultrasonic welding is generally carried out at an output frequency of from 15 to 40 kHz under a clamping pressure of from 0.5 to 7 kg/cm$^2$ for a time of from about 0.05 to about 10 seconds.

The shape and material of the negative electrode casing may be suitably chosen depending on the type of cell. Usually, the negative electrode casing is made of stainless steel. The same applies to the positive electrode casing.

The electrolyte used in electrochemically forming a lithium-aluminum layer as described above may be selected from a variety of electrolytes. Preferred electrolytes are lithium salts, for example, one or more salts selected from $LiClO_4$, $LiBF_4$, $LiSO_3CF_3$, $LiPF_6$ and $LiAsF_6$ dissolved in suitable solvents. The solvents used herein include propylene carbonate, dimethoxyethane, tetrahydrofuran, ethylene carbonate, gamma-butyrolactone, dioxolane, butylene carbonate and dimethylformamide alone or in admixture of two or more. The liquid electrolyte is desired to have as low a water content as possible, and preferably contains about 0.1 to about 3 mol per liter of the lithium salt.

The degree of formation of lithium-aluminum alloy may be determined by a visual observation. When lithium remains, a metallic luster characteristic of lithium can be observed. Since lithium often remains scattered like islands, the presence of residual lithium can be seen by an observation of its metallic luster.

The shape and size of the lithium-aluminum alloy/aluminum electrode may be selected over a wide range and is not particularly limited. For example, the electrode may have the shape of a small disk when it is used as the negative electrode for coin-shaped cells, or the shape of a rectangular plate when it is used as the negative electrode for spiral structure cells.

The positive electrode used in the cell of the present invention is not particularly limited and may be selected over a wide range because the negative electrode defined above is well compatible with any type of positive electrode for lithium cells. For example, the positive electrode may be formed from organic electroconductive high-molecular weight materials, for example, polymers of benzene and derivatives thereof such as polyacethylene, polybenzene, polypara-phenylene, polyaniline, polytriphenylamine, polydibutoxyphenylene, polyphenylene vinylene, and polyquinoline; polymers of heterocyclic and polynuclear aromatic compounds such as polypyridine, polythiophene, polyfuran, polypyrol, polyanthracene, and polynaphthalene; graphite; metal oxides such as $TiO_2$, $Cr_2O_3$, $V_2O_5$, $V_6O_{13}$, $MnO_2$, $CuO$, $MoO_3$, and $Cu_5O_{10}$; metal sulfides such as $TiS_2$, $FeS$, $CuCoS_4$ and $MoS_3$; and metal selenides such as $NbSe_3$ and $VSe_2$. Preferred positive electrode active material is polyaniline because it can be formed by electrochemical polymerization as being firmly bonded to a substrate such as metals and carbon compacts. Another advantage is that an as-formed composite structure of the substrate having polyaniline deposited thereon can be used in a cell such that the polyaniline may serve as the positive electrode and the substrate may serve as the positive electrode current collector or a casing.

The form and shape of the positive electrode substrate are not particularly limited. For example, fiber, fabric, non-woven fabric, film, plate and powder may be used in any desired shape. When graphite is the positive electrode active material, for example, the substrate may be formed from carbon fibers, carbon cloth, carbon non-woven fabric, carbon sheet, carbon foil, carbon foam, and carbon powder.

When organic electroconductive highmolecular weight material is used as the positive electrode active material, the positive electrode may be secured to the positive electrode casing directly or through a current collector, preventing any poor electrical contact which would otherwise occur between the positive electrode of organic electroconductive high-molecular weight material and the positive electrode casing. Then any surge of the internal resistance during service operation is prevented. The resulting cell is excellent as a secondary cell as it has an extended cycle life and can keep stable electrical connection for an extended period of time.

The electrolyte for the cell may be the same as the electrolyte used in forming a lithium-aluminum alloy. More particularly, the electrolyte used in the cell of the present invention may be a liquid electrolyte which is obtained by dissolving an ionic compound in a solvent. The ionic compounds which can form the electrolyte solution used in the cell are compounds having an anion combined with a lithium ion. Some illustrative, non-limiting examples of the anion include anions of Group Va element halides such as $PF_6-$, $AsF_6-$, $SbF_6-$, and $SbCl_6-$. anions of Group IIIa element halides such as $BF_4-$ and $Cl-$, perchlorate anions such as $ClO_4-$, and $HF_2-$, $CF_3SO_4-$, $HSO_4-$, etc. illustrative examples of the compounds having such anions and lithium ion include $LiPF_6$, $LiAsF_6$, $LiSbF_6$, $LiClO_4$, $LiI$, $LiBr$, $LiCl$, $LiCl$, $LiBF_4$, $LiAlCl_4$, $LiHF_2$, $LiSCN$, and $LiSO_3CF_3$. Among them, $LiClO_4$, $LiBF_4$, $LiPF_6$, $LiI$, $LiBr$ and $LiCl$ are advantageous for the manufacture of lightweight stable cells.

The type of solvent in which the ionic compound is dissolved to form the liquid electrolyte is not particularly limited although relatively highly polar solvents are preferred. Examples of the solvents include organic solvents such as propylene carbonate, ethylene carbonate, benzonitrile, tetrahydrofuran, 2-methyltetrahydrofuran, gamma-butyrolactone, dioxolane, methylene chloride, triethyl phosphate, triethyl phosphite, dimethyl sulfate, dimethylformamide, dimethylacetamide, dimethyl sulfoxide, dioxane, dimethoxyethane, polyethylene glycol, sulfolane, dichloroethane, chlorobenzene, nitrobenzene, and mixtures thereof.

The electrolyte used in the cell of the present invention further includes organic solid electrolytes which are obtained by impregnating such polymers as polyethylene oxide, polypropylene oxide, isocyanate-crosslinked polyethylene oxide, and phosphazine polymer having an ethylene oxide oligomer side chain with the above-mentioned electrolyte compounds; and inorganic solid electrolytes, for example, inorganic ion conductors such as $Li_3N$ and $LiBCl_4$ and lithium glass species such as $Li_{SiO4}$ and $Li_3BO_3$.

The cell of the present invention is preferably constructed by interposing a separator between the positive and negative electrodes in order to prevent the electrodes from contacting each other to cause current shortcircuit. The separator is preferably a porous material which can be impregnated with and allow passage of the electrolyte, for example, woven and non-woven fabrics and nets of synthetic resins such as polytetrafluoroethylene, polypropylene and polyethylene.

As described above, the use of a negative electrode having improved performance, particularly an extended cycle life according to the present invention results in secondary lithium cells of coin and box types which are improved in practical performance.

EXAMPLES

Examples of the present invention are given below by way of illustration and not by way of limitation.

EXAMPLE 1

A lithium-clad aluminum disk to be used as the negative electrode was prepared from an aluminum disk having a diameter of 1.5 cm and a thickness of 200 $\mu$m by bonding a similar disk of 15 mg lithium to one surface of the aluminum disk under pressure. A coin type secondary cell as illustrated in the figure having a thickness of 1.5 mm and a diameter of 2.0 cm was fabricated by using the lithium-clad aluminum disk as the negative electrode, a polyaniline film as the positive electrode, stainless steel nets as the positive and negative electrode current collectors, a mixture of propylene carbonate and dimethoxyethane in a ration of 1:1 containing LiBF$_4$ as the electrolyte, and a polypropylene sheet as the separator. These components were placed in positive and negative electrode casings, which were sealed with a polypropylene gasket. The positive and negative electrode current collectors were spot welded to the positive and negative electrode casings, respectively. The negative electrode current collector were spot welded to the negative electrode on its aluminum side.

After 3 days, a second sealing operation was carried out by compacting the container to reduce its thickness to 1.53 mm. At this point, the interior volume of the container was reduced by about 4% of the initial volume.

After further 3 days, the cell was disassembled. The negative electrode was observed to find that a grey lithium-aluminum alloy was formed over the entire surface while metallic lithium was little left.

The thus prepared negative electrode had a two-layer structure in which a lithium-aluminum alloy layer was electrochemically formed on one surface of the aluminum disk and the opposite surface portion of the aluminum disk remote from the lithium cladding was left as an aluminum layer. The lithium-aluminum alloy layer had a thickness of 150 $\mu$m, the aluminum layer has a thickness of 75 $\mu$m, and the total thickness was 225 $\mu$m, with the thickness ratio of lithium-aluminum alloy layer to aluminum layer being equal to 2.

The cell of the above construction was subjected to a cycle life test by repeating a cycle of 1-hour charging and 1-hour discharging at a constant current of 1.0 milliampere (mA). The cell could withstand 1235 charge/discharge cycles.

EXAMPLE 2

A lithium-clad aluminum disk to be used as the negative electrode was prepared by abrading one surface of an aluminum disk having a diameter of 1.5 cm and a thickness of 200 $\mu$m. The aluminum disk after abrasion was measured for surface roughness by a surface roughness meter to find a root means square deviation of roughness of 3.5 $\mu$m. A similar disk of about 13 mg lithium was bonded to the abraded surface of the aluminum disk under pressure. A coin type secondary cell having a thickness of 1.6 mm and a diameter of 2.0 cm was fabricated by using the lithium-clad aluminum disk as the negative electrode, a polyaniline film as the positive electrode, stainless steel nets as the positive and negative electrode current collectors, a mixture of propylene carbonate and dimethoxyethane in a ratio of 1:1 containing LiBF$_4$ as the electrolyte, and a polypropylene sheet as the separator. These components were placed in positive and negative electrode casings, which were assembled and sealed with a polypropylene gasket. The cell was put under pressure.

After 3 days, the cell was disassembled. The negative electrode was observed to find that a grey lithium-aluminum alloy was formed over the entire surface while metallic lithium was little left.

The thus prepared negative electrode had a two-layer structure in which a lithium-aluminum alloy layer was electrochemically formed on one surface of the aluminum disk and the opposite surface portion of the aluminum disk remote from the lithium cladding was left as an aluminum layer. The lithium-aluminum alloy layer had a thickness of 130 $\mu$m, the aluminum layer has a thickness of 85 $\mu$m, and the total thickness was 215 $\mu$m, with the thickness ratio of lithium-aluminum alloy layer to aluminum layer being equal to about 3/2.

The cell thus fabricated was repeatedly charged and discharged within the voltage range between an upper limit of 3.3 volts and a lower limit of 2.0 volts. The discharging capacity and internal resistance of the cell were measured both at the initial and after 100 cycles. Their changes were calculated to evaluate cycle performance.

Another cell fabricated by the same procedure as above was allowed to stand for one week at 60° C. before it was measured for discharging capacity and internal resistance to evaluate the self-discharging property of the cell.

The results are shown below.

TABLE 1

|  | Discharge capacity | Internal resistance |
| --- | --- | --- |
| Initial | 4.2 mAh | 15 Ω |
| After 100 cycles | 3.8 mAh | 18 Ω |
| After aged 1 week at 60° C. | 4.0 mAh | 21 Ω |

EXAMPLE 3

A lithium-clad aluminum disk to be used as the negative electrode was prepared from an aluminum disk having a diameter of 1.5 cm and a thickness of 200 $\mu$m by bonding a similar disk of 15 mg lithium to one surface of the aluminum disk under pressure. A coin type secondary cell having a thickness of 1.6 mm and a diameter of 2.0 cm was fabricated by using the lithium-clad aluminum disk as the negative electrode, a polyaniline film as the positive electrode, a mixture of propylene carbonate and dimethoxyethane in a ratio of 1:1 containing LiBF$_4$ as the electrolyte, stainless steel nets as the negative and positive collectors and a polypropylene sheet as the separator. These components were placed in positive and negative electrode casings, which were assembled and sealed with a polypropylene gasket.

The container of this coin type cell was pressed for 24 hours under a pressure of 120 kg/cm² at room temperature by a press. After pressing, the cell was disassembled. The negative electrode was taken out of the cell and visually observed to find that a grey lithium-aluminum alloy was formed over the entire surface of the aluminum disk and only a trace of metallic lithium was left.

The thus formed negative electrode had a two-layer structure in which a lithium-aluminum alloy layer was electrochemically formed on one surface of the aluminum disk and the opposite surface portion of the aluminum disk remote from the lithium cladding was left as an aluminum layer. The lithium-aluminum alloy layer had a thickness of 150 μm, the aluminum layer has a thickness of 75 μm, and the total thickness was 225 μm, with the thickness ratio of lithium-aluminum alloy layer to aluminum layer being equal to 2.

The cell of the above construction was subjected to a cycle life test by repeating a cycle of 1-hour charging and 1-discharging at a constant current of 1.0 mA. The cell could withstand 1650 charge/discharge cycles.

EXAMPLE 4

A coin-type cell was fabricated by the same procedure as in Example 3. The container of the cell was isostatically pressed for 24 hours under a pressure of 150 kg/cm² at room temperature by a cold isostatic press. After pressing, the cell was disassembled. The negative electrode was taken out of the cell and visually observed to find that a grey lithium-aluminum alloy was formed over the entire surface of the aluminum disk and only a trace of metallic lithium was left.

The thus formed negative electrode had a two-layer structure in which a lithium-aluminum alloy layer was electrochemically formed on one surface of the aluminum disk and the opposite surface portion of the aluminum disk remote from the lithium cladding was left as an aluminum layer. The lithium-aluminum alloy layer had a thickness of 150 μm, the aluminum layer has a thickness of 75 μm, and the total thickness was 225 μm, with the thickness ratio of lithium-aluminum alloy layer to aluminum layer being equal to 2.

The cell of the above construction was charged and discharged at a constant current of 0.5 mA within the voltage range between an upper limit of 3.3 volts and a lower limit of 2.0 volts, determining a discharging capacity of 4.0 mAh. The cell was charged again under the same conditions and then allowed to stand for one week at 60° C. The aged cell showed a discharging capacity of 3.4 mAh, which indicates a self-discharge of 15%.

EXAMPLE 5

A coin-type cell was fabricated by the same procedure as in Example 1. A second sealing operation was carried out on the second day, and a third sealing operation was carried out on the third day. The thickness of the container was reduced to 1.55 mm and 1.51 mm by the second and third sealing operations, respectively. The final interior volume of the container was a reduction of about 6% of the initial interior volume of the container.

The cell was disassembled as in Example 1. The negative electrode was taken out of the cell and visually observed to find that a grey lithium-aluminum alloy was formed over the entire surface of the aluminum disk and only a trace of metallic lithium was left.

The thus formed negative electrode had a two-layer structure in which a lithium-aluminum alloy layer was electrochemically formed in one surface of the aluminum disk and the opposite surface portion of the aluminum disk remote from the lithium cladding was left as an aluminum layer. The lithium-aluminum alloy layer had a thickness of 150 μm, the aluminum layer has a thickness of μm, and the total thickness was 225 μm, with the thickness ratio of lithium-aluminum alloy layer to aluminum layer being equal to 2.

The cell of the above construction was charged and discharged at a constant current of 0.5 mA within the voltage range between an upper limit of 3.3 volts and a lower limit of 2.0 volts, determining a discharging capacity of 4.0 mAh. The cell was charged again under the same conditions and then allowed to stand for one week at 60° C. The aged cell showed a discharging capacity of 3.4 mAh, which indicates a self-discharge of 15%.

EXAMPLE 6

An aluminum disk having a diameter of 1.5 cm and a thickness of 200 μm was attached to a coin-type cell negative electrode casing by ultrasonic welding at a nominal frequency of 19 kHz and a clamping force of 55 kg for a welding time of 0.15 seconds. The disk was welded to the casing at 40 spots. A similar disk of 15 mg lithium was bonded to the exposed surface of the aluminum disk under pressure. The lithium-clad aluminum disk was to eventually form a negative electrode.

A coin type secondary cell having a thickness of 1.6 mm and a diameter of 2.0 cm was fabricated by using the negative electrode casing having welded thereto the lithium-clad aluminum disk as the negative electrode, a polyaniline film as the positive electrode, a mixture of propylene carbonate and dimethoxyethane in a ratio of 1:1 containing LiBF₄ as the electrolyte, and a polypropylene sheet as the separator. These components were placed in positive and negative electrode casings, which were assembled and sealed with a polypropylene gasket.

The cell was allowed to stand for 6 days after fabrication. The cell was disassembled. The negative electrode was observed to find that a grey lithium-aluminum alloy was formed over the entire surface while metallic lithium was little left.

The thus formed negative electrode had a two-layer structure in which a lithium-aluminum alloy layer was electrochemically formed on one surface of the aluminum disk and the opposite surface portion of the aluminum disk remote from the lithium cladding was left as an aluminum layer. The lithium-aluminum alloy layer had a thickness of 150 μm, the aluminum layer has a thickness of 75 μm, and the total thickness was 225 μm, with the thickness ratio of lithium-aluminum alloy layer to aluminum layer being equal to 2.

The cell of the above construction was subjected to a cycle life test by repeating a cycle of 1-hour charging and 1-hour discharging at a constant current of 1.0 mA. The cell could withstand 1560 charge/discharge cycles.

EXAMPLE 7

A coin-type cell was fabricated by the same procedure as in Example 6 except that the aluminum disk was welded to the negative electrode casing at 30 spots by a resistance welding machine.

The cell was allowed to stand for 6 days after fabrication. The cell was disassembled. The negative electrode was observed to find that a grey lithium-aluminum alloy was formed over the entire surface as in Example 6.

The thus formed negative electrode had a two-layer structure in which a lithium-aluminum alloy layer was electrochemically formed on one surface of the aluminum disk and the opposite surface portion of the aluminum disk remote from the lithium cladding was left as an aluminum layer. The lithium-aluminum alloy layer had a thickness of 150 μm, the aluminum layer has a thickness of 75 μm, and the total thickness was 225 μm, with the thickness ratio of lithium-aluminum alloy layer to aluminum layer being equal to 2.

The cell of the above construction was charged and discharged at a constant current of 0.5 mA within the voltage range between an upper limit of 3.3 volts and a lower limit of 2.0 volts, determining a discharging capacity of 4.0 mAh. The cell was charged again under the same conditions and then allowed to stand for one week at 60° C. The aged cell showed a discharging capacity of 3.4 mAh, which indicates a self-discharge of 15%.

EXAMPLE 8

An aluminum disk having a diameter of 15 mm and a thickness of 0.2 mm was attached to a coin-type cell negative electrode casing by ultrasonic welding at an output frequency of 20 kHz and a clamping pressure of 2 kg/cm² for a welding time of ½ seconds at 40 spots. A similar disk of 14 mg lithium was bonded to the exposed surface of the aluminum disk under pressure. The lithium-clad aluminum disk was to eventually form a negative electrode.

A coin type secondary cell having a thickness of 1.6 mm and a diameter of 20 mm was fabricated by using the negative electrode casing having welded thereto the lithium-clad aluminum disk as the negative electrode, a polyaniline film as the positive electrode, a mixture of propylene carbonate and dimethoxyethane in a ratio of 1:1 containing $LiBF_4$ as the electrolyte, and a polypropylene sheet as the separator. These components were placed in positive and negative electrode casings, which were assembled and sealed with a polypropylene gasket.

The cell was allowed to stand for 6 days after fabrication. The cell was disassembled. The negative electrode was observed to find that a grey lithium-aluminum alloy was formed over the entire surface while metallic lithium was little left.

The thus formed negative electrode had a two-layer structure in which a lithium-aluminum alloy layer was electrochemically formed on one surface of the aluminum disk and the opposite surface portion of the aluminum disk remote from the lithium cladding was left as an aluminum layer. The lithium-aluminum alloy layer had a thickness of 140 μm, the aluminum layer has a thickness of 80 μm, and the total thickness was 220 μm, with the thickness ratio of lithium-aluminum alloy layer to aluminum layer being equal to 1.75.

The cell of the above construction was subjected to a cycle life test by repeating a cycle of 1-hour charging and 1-discharging at a constant current of 1.0 mA. The cell could withstand 1650 charge/discharge cycles.

Another cell of the above construction was charged and discharged at a constant current of 0.5 mA within the voltage range between an upper limit of 3.3 volts and a lower limit of 2.0 volts, determining a discharging capacity of 4.0 mAh. The cell was charged again under the same conditions and then allowed to stand for one week at 60° C. The aged cell showed a discharging capacity of 3.8 mAh, which indicates a self-discharge of 5%.

Although preferred embodiments of the present invention are described, obviously numerous modifications and variations of the present invention are possible in light of the above teachings. It is therefore to be understood that within the scope of the appended claims, the invention may be practiced otherwise than as specifically described herein.

What is claimed is:

1. In an electric cell comprising a positive electrode composed of an organic electroconductive polymer, a negative electrode, and an electrolyte containing a lithium salt,
   the improvement wherein the negative electrode has a two-layer structure consisting essentially of a lithium-aluminum alloy layer and an aluminum layer, wherein the lithium-aluminum alloy layer is from 0.5 times to 3.5 times as thick as the aluminum layer.

2. The cell of claim 1 wherein the aluminum layer is of aluminum having a purity of at least 99.0%.

3. The cell of claim 1 wherein the lithium-aluminum alloy layer has a composition comprising 40 to 60 atom % of lithium and 60 to 40 atom % of aluminum.

4. The cell of claim 1 wherein the lithium-aluminum alloy layer is electrochemically formed by bonding lithium to aluminum substrate under pressure and immersing the lithium-clad aluminum substrate in an organic solvent containing a lithium salt.

5. The cell of claim 4 wherein the lithium-aluminum alloy layer is formed in situ by placing the lithium-clad aluminum substrate in the cell.

6. The cell of claim 4 wherein the surface of the aluminum substrate to which lithium is bonded had a surface roughness with a root mean square deviation of from 1.5 to 5 μm.

7. The cell of claim 1 which further comprises a negative electrode casing wherein the aluminum layer is directly secured to the casing at five or more points.

8. The cell of claim 7 wherein the aluminum layer is secured to the casing by ultrasonic welding.

9. The cell of claim 1 wherein the positive electrode is comprised of polyaniline.

10. In the process for preparing an electric cell, comprising the steps of placing a positive electrode composed of an organic electroconductive polymer, a negative electrode, and an electrolyte in a cell container comprising positive and negative electrode casings, and forming a seal between the positive and negative electrode casings,
    the improvement wherein the negative electrode is formed in situ in the cell container by contact bonding lithium to an aluminum substrate, placing the lithium-clad aluminum substrate in the cell container, filling the container with an electrolyte containing a lithium salt that the lithium-clad aluminum substrate is immersed in the electrolyte, and electrochemically alloying the lithium into a lithium into a lithium-aluminum alloy, thereby forming a negative electrode of a two layer structure consisting essentially of a lithium-aluminum alloy layer and an aluminum layer, wherein the lithium-aluminum alloy layer is from 0.5 times to 3.5 times as thick as the aluminum layer.

11. The process of claim 10 wherein the aluminum layer is of aluminum having a purity of at least 99.0%.

12. The process of claim 10 wherein the lithium-aluminum alloy layer has a composition comprising 40 to 60 atom % of lithium and 60 to 40 atom % of aluminum.

13. The process of claim 10 wherein the surface of the aluminum substrate to which lithium is bonded has a surface roughness with a root mean square deviation of from 1.5 to 5 μm.

14. The process of claim 10 wherein after the cell was assembled by sealing the positive electrode, negative electrode and electrolyte in the cell container, the cell container is pressed to bring the lithium in close contact with the aluminum substrate.

15. The process of claim 14 wherein the container is pressed under a pressure of at least 10 kg/cm$^2$.

16. The process of claim 10 wherein the step of forming a seal between the positive and negative electrode casings comprises repeating sealing operation as the volume of the contents of the cell container changes, thereby maintaining the interior of the container in a sealed condition.

17. The process of claim 16 wherein the second and subsequent sealing operations are carried out so as to reduce the interior volume of the container.

18. The process of claim 17 wherein the interior volume of the container is reduced by 1 to 40% of the interior volume of the container at the end of the first sealing operation.

19. The process of claim 10 wherein the aluminum layer is directly secured to the casing at five or more points.

20. The process of claim 19 which further comprises
securing one surface of the aluminum substrate to the negative electrode casing at five or more points,
contact bonding lithium to the other surface of the aluminum substrate, and
electrochemically converting the lithium into a lithium-aluminum alloy within the container.

21. The process of claim 20 wherein the aluminum substrate is secured to the casing by ultrasonic welding.

* * * * *